United States Patent [19]

McGinty

[11] 4,410,553
[45] Oct. 18, 1983

[54] METHOD AND APPARATUS FOR COOKING PARTICULATE FOODSTUFFS

[76] Inventor: James McGinty, 107 Ferguson St., Palmerston North, New Zealand

[21] Appl. No.: 297,101

[22] Filed: Aug. 28, 1981

[51] Int. Cl.³ .............. A23L 1/00; A47J 27/026
[52] U.S. Cl. ............................. 426/243; 99/348; 99/427; 99/447; 99/450; 426/519; 426/523
[58] Field of Search ............... 426/241, 243, 523, 519; 99/348, 427, 447, 404, 443 C, 450

[56] References Cited

U.S. PATENT DOCUMENTS

| | | | |
|---|---|---|---|
| 2,939,383 | 6/1960 | Kanaga | 99/348 |
| 4,103,605 | 8/1978 | Hemborg et al. | 99/348 |
| 4,155,294 | 5/1979 | Langhammer et al. | 99/447 |

FOREIGN PATENT DOCUMENTS

| | | |
|---|---|---|
| 2452906 | 10/1980 | France ............ 99/427 |
| 64698 | 4/1930 | New Zealand . |
| 92394 | 12/1945 | New Zealand . |
| 100435 | 11/1948 | New Zealand . |
| 123370 | 4/1959 | New Zealand . |
| 130414 | 10/1961 | New Zealand . |
| 1526325 | 5/1968 | New Zealand . |
| 158320 | 11/1969 | New Zealand . |
| 163268 | 4/1971 | New Zealand . |
| 163429 | 4/1971 | New Zealand . |
| 131134 | 1/1972 | New Zealand . |
| 164847 | 12/1972 | New Zealand . |
| 170308 | 4/1973 | New Zealand . |
| 173553 | 3/1974 | New Zealand . |
| 174738 | 7/1974 | New Zealand . |
| 179534 | 12/1975 | New Zealand . |
| 179583 | 12/1975 | New Zealand . |
| 182421 | 10/1976 | New Zealand . |

Primary Examiner—Jones: Raymond N.
Assistant Examiner—George C. Yeung
Attorney, Agent, or Firm—Schwartz, Jeffery, Schwaab, Mack, Blumenthal & Koch

[57] ABSTRACT

A cooking apparatus for cooking particulate foods comprising an elongated source of radiant heat, a container for retaining the food adjacent the source of heat, a helical device within the container for moving the food through the container and along the source of heat, the helical device having a lesser pitch at the feed end than at the discharge end so that the food is moved more slowly near the feed end and more quickly near the discharge end, means for causing the food to cascade as it passes through the container, the apparatus being arranged so that food which is introduced into one end of the container is advanced therealong at a progressively increasing rate and cascaded therein in order to produce even cooking of the food as it passes through the apparatus.

7 Claims, 5 Drawing Figures

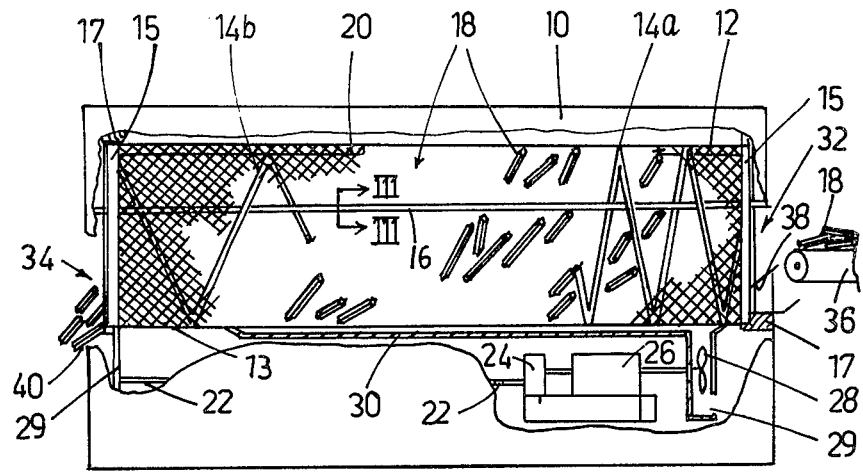
FIG.1.
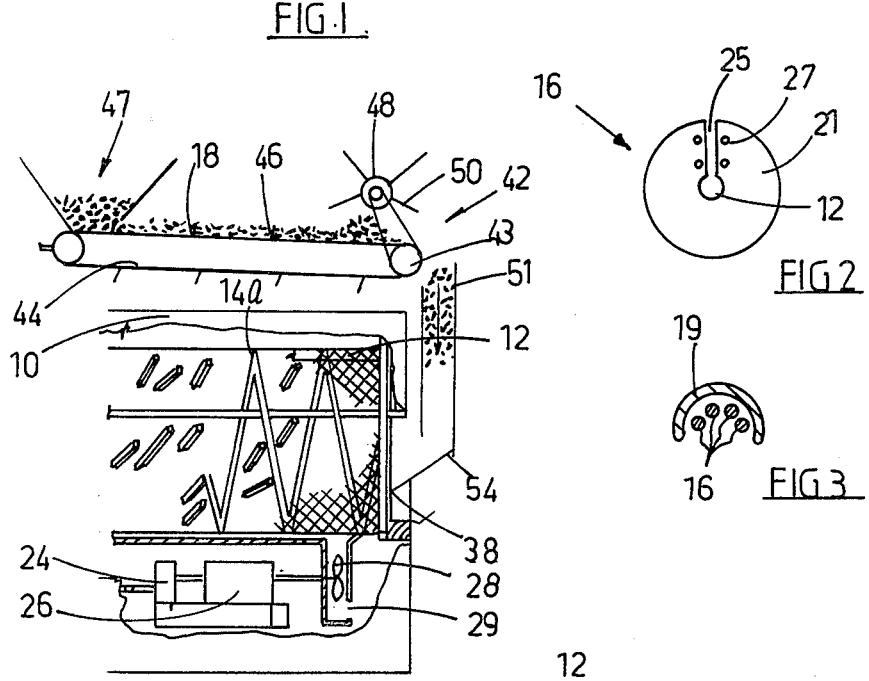
FIG 4
FIG 2
FIG 3
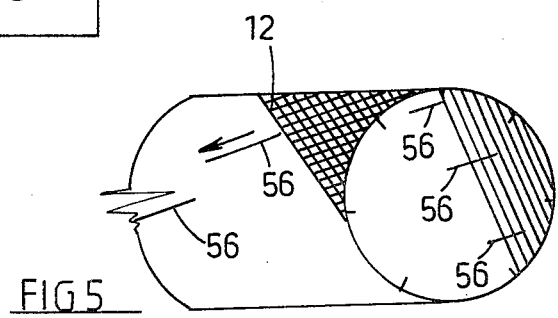
FIG 5

METHOD AND APPARATUS FOR COOKING PARTICULATE FOODSTUFFS

This invention relates to a continuous cooking apparatus and method for cooking particulate foodstuffs. More particularly it relates to a cooker for preparing potato chips without using a deep fat frying process.

There are many disadvantages to the preparation of deep fat fried particulate foodstuffs such as potato chips. The cost of the fat itself is very high and the fat is progressively degraded owing to the high temperatures employed. There is a major cost in electricity for heating the fat to cooking temperatures and finally there is the problem of discharging the smoke and odours from a deep fat fryer.

It is an object of this invention to go some way toward obviating these disadvantages or at least to offer the public a useful choice.

It is known to use radiant heat elements in association with conveying systems. However the disadvantage with existing such systems is that the radiant heat comes from one direction and the unexposed sides of foodstuffs are not cooked to the same degree as the exposed sides.

It is a further object of this invention to go some way towards overcoming this disadvantage or at least to offer the public a useful choice.

Accordingly, the invention may be said broadly to consist in cooking apparatus for particulate foodstuffs comprising an elongate source of radiant heat, means for retaining said foodstuffs adjacent said source, means for advancing said foodstuffs along said retaining means and means for cascading said foodstuffs within said retaining means, the arrangement being such that in use foodstuffs placed in one end of said retaining means are advanced therealong and cascaded therein to emerge cooked at the other end thereof.

Preferably said elongate source of radiant heat is a single resistance electric heater element.

Alternatively said elongate source of radiant heat comprises multiple bar resistance electric heater elements having an associated concave reflector.

Preferably said heater element(s) emit(s) infrared radiation.

Preferably said means for retaining said foodstuffs adjacent said source comprises an elongate cage structure open at either end thereof.

Preferably said cage structure has a wire mesh surface.

Alternatively said cage structure is expanded metal.

Alternatively said cage structure comprises perforated metal sheeting.

Preferably said cage structure is cylindrical.

Alternatively said cage structure has a square or rectangular section.

Alternatively said cage structure has a polygonal section.

Alternatively said cage structure has an elliptical section.

Preferably said advancing means comprises a helix on the inside of said retaining means.

In one embodiment said helix rotates to advance foodstuffs while said retaining means remains stationary.

In another embodiment said helix is fixed to the inside surface of said retaining means and rotates therewith.

Preferably said helix has a variable pitch, the smallest pitch being in the area where the cooking is conducted for the longest length of time.

Preferably said helix is in segments.

Preferably said cascading means comprises said helix and said retaining means.

Preferably said cascading means comprises a single rib projecting inwardly toward the longitudinal axis of said retaining means from the inner surface thereof.

Preferably said rib is substantially parallel to said longitudinal axis.

Alternatively there are at least a pair of said ribs.

Preferably there is included a source of forced air blowing through said retaining means.

Preferably said source is directed substantially along the path of said helix.

Preferably there is included heating means in association with said source of forced air for heating said forced air to the temperature of air adjacent said source of radiant heat.

In another embodiment the invention may be said broadly to consist in a method of cooking particular foodstuffs which comprises feeding particular foodstuffs into a retaining area adjacent a source of infrared radiation, cascading said particulate foodstuffs in said retaining area so as to expose all surfaces of said foodstuffs to said infrared radiation for a predetermined cooking time, advancing said foodstuffs along said retaining area and discharging said particulate food stuffs from said retaining area.

The invention may be more fully understood by having reference to the accompanying drawings in which:

FIG. 1 is a side elevation with parts broken away of a preferred embodiment of the invention.

FIG. 2 is a plan view of a helix segment according to the invention manufactured from a metal disc.

FIG. 3 is the section view III—III of an alternative arrangement of the heating element.

FIG. 4 is a fragmentary sectional view of a feeding device for feeding the embodiment illustrated in FIG. 2.

FIG. 5 is a fragmentary isometric view of an alternative drum construction employing vanes instead of a helix.

The cooker comprises an outer casing 10 made of stainless steel or the like provided with suitable insulation on the inside. Within said casing 10 is a foodstuff retaining means in the form of a cylindrical drum or cage 12 having a mesh, perforated metal sheeting or expanded metal outer surface 13. In one embodiment the drum 12 is rotatable as will be described below while in another embodiment it is stationary.

Mounted with the drum 12 is a helix 14a and 14b. The surface 13 and helix 14a and b are preferably of stainless steel and may have a non-stick surface. Typically a drum 12 would be approximately 1 m long and 350 mm in diameter. The pitch of helix 14 would be approximately 150 mm in the area of 14b.

In an alternative construction helix 14 is divided into a number of segments for easier removal for cleaning. The segments can be in registry with one another or spaced from one another.

In a still further alternative construction the pitch of the helix 14 is constant at about 150 mm and the drum 12 has the dimensions stated above.

A preferred mode of construction of a helix is shown in FIG. 2. A disc 21 of stainless steel or the equivalent has a central circular portion 23 removed. A slot 25 is cut from the circumference to the centre and holes 27 drilled for rivots or bolts. The disc 21 is then twisted into a helix segment. Adjacent segments are bolted or riveted together and the end helix pieces bolted or rivotted to the frame of the drum 12 at each end.

Extending through the centre of drum 12 is a source of radiant energy such as a glass spherical resistance heating element 16. Alternatively a looped resistance heating element such as is used for grilling in an oven may be used. A preferred heating element is illustrated in FIG. 3. A cylindrical reflector 19 with a segment of one third to one half of its circumference cut away is provided within drum 12 in place of single element 16. Four resistance heating elements 16 which emit infrared radiation are fitted in the positions shown adjacent reflector 19.

In one embodiment a single rib 20 is fixed along the inside edge of drum 12 in a direction parallel to the longitudinal axis of the drum. This rib 20 is optional for reasons to be explained below. A pair of ribs may be employed but they have the disadvantage of creating more mechanical handling of the chips.

A means of reducing heat loss and means for assisting the cascading of food passing through the drum 12 is provided by a blower fan 28 which communicates with a slot 30 along the bottom of the drum 12. Blower fan 28 is driven through a motor 26. Drive is also taken from motor 26 through reduction box 24 to drive a main shaft 22. Air is continuously recirculated within casing 10, through inlet orifice 29, past fan 28 and out discharge slot 30. Slot 30 is provided with baffles to direct air along substantially the path followed by the helix 14. The baffles and ducting are arranged to avoid blowing directly at the heating element 16 as the foodstuffs could suffer local burning if they contacted the heating element 16. Reflector 19 also services to avoid contact of chips with element 16.

There is an opening 32 at the feeding end of casing 10 and an opening 34 at the discharge end thereof. Chips 18 are fed by conveyor 36 onto lip 38 which feeds them into the drum 12. Cooked chips are discharged out lip 40 at the discharge end 34 of drum 12.

In the embodiment illustrated an annular frame member 15 is provided around the circumference at each end of drum 12. Each frame member 15 is mounted in a bearing block 17. This arrangement leaves orifices 32 and 34 open to allow charging and discharging of the foodstuffs. A friction driving wheel 29 contacts and rotates frame member 15. Wheel 29 is mounted at the end of driving shaft 22. In operation a charge of particulate foodstuffs 18 such as potatoes cut into the form of chips is fed along conveyor 36 and onto lip 38 of inlet 32. Foodstuffs 18 can be preheated by a source of radiant heat if desired or alternatively can even be fed in a frozen condition into the drum 12. The helix 14a is of a small pitch so as to advance the foodstuffs as slowly as possible at the beginning of the cooking process.

In the embodiment where drum 12 rotates with rib 20 and helix 14 of the combined action of the ribs 20 and helix 14 serves to lift the foodstuffs 18 through a portion of a rotation of the drum until they cascade again to the floor of the drum. The cascading action is assisted by the blowing of air through the bottom slot 30 of the drum by means of blower fan 28. However, this blower fan is an optional integer and there is sufficient cascading action provided by the elements in the drum alone.

In an alternative embodiment a drum is stationary and helix 14 and rib 20 rotate to produce a cascading action which is substantially the same as that described above.

In the embodiment illustrated one single rib 20 is provided but it will be appreciated that a number of ribs extending the length of drum 12 or shorter ribs between the helix members can be provided to serve a cascading function.

The cascading function is provided to ensure that the foodstuffs are cooked on all sides. Complete cooking is also assisted by providing for ducting so that the air being circulated via fan 28 along duct 30 is heated to substantially the same temperature as air next to heating elements 16.

As the foodstuffs become more and more cooked they are advanced at a higher rate out of the discharge end 34 of the drum 12 and down lip 40. Helix portion 14b has a longer pitch to advance the foodstuffs out of the mouth 34 of the cooker at a rate quicker than they are advanced in the area of helix portion 14a.

In a typical operation cooking time would be in the order of 6 minutes but residence time in the area of helix portion 14a would be approximately two thirds of this.

In the embodiment illustrated in FIG. 4 an endless conveyor 42 is provided adjacent the casing 10 of the apparatus. An endless belt 44 having dividers 46 across the face thereof is driven in the conveyor. A hopper 47 is provided to feed particulate foodstuffs such as potato chips 18 as illustrated. A hub 48 having vanes 50 projecting radially outward therefrom is provided adjacent the end of one leg of travel of conveyor 42. Sprocket wheel 43 drives both the conveyor 42 and the drum 48. A chute 51 is positioned near the end of a conveyor 42. A lip 54 feeds into the drum 12. In operation chips 18 are fed into hopper 47 and conveyed along the upper leg of belt 44 in compartments created by dividers 46. Vanes 50 are synchronised with the operation of the drum 12 so that a vane 50 stacks up a supply of foodstuffs while a portion of a helix 14a is across the opening into the drum 12. Vane 50 then releases the stacked up of chips and it falls into the open of the drum 12.

In the embodiment illustrated in FIG. 5 there are no helixes provided. Rather a series of vanes 56 are positioned on the sides of the drum at an angle shown whereby they achieve both a cascading and an advancing action. In a still further embodiment the drum 12 of either FIG. 1 or FIG. 5 may be tilted at a slight angle from the infeed end to the outfeed.

This invention can be used in combination with other known conveyor cookers for preparing such foodstuffs as fish in a batter. Heat generated can be used with heat exchangers in associated dishwashers or the like to maximise use of energy.

It will be seen that cost savings available with the apparatus according to this invention include the savings of cooking oil and the cost for heating the cooking oil. It has been observed that potato chips and fish and chicken pieces of an acceptable quality have been prepared through using the apparatus of this invention.

What is claimed is:

1. A method of continuously cooking particulate foodstuffs comprising feeding the foodstuff into an elongate receptacle at a feed end thereof, providing helical conveying means in said receptacle having a lesser pitch at said feed end than at a discharge end of said receptacle, conveying the foodstuff through said receptacle and adjacent a source of radiant heat within said receptacle for cooking the foodstuff as it progresses through said receptacle, causing the foodstuff to cascade as it progresses through said receptacle, whereby the foodstuff is moved through said receptacle more slowly and thereby cooked more quickly near said feed end, and moved more quickly and thereby cooked more slowly near said discharge end.

2. A method as in claim 1 and including feeding the foodstuff to said receptacle on an endless conveyor and preheating the foodstuff prior to discharge into said receptacle.

3. A method as in claim 2 and including causing said cascading by blowing warm air into said receptacle.

4. An apparatus for continuously cooking particulate foodstuffs comprising an elongate receptacle having a feed end and a discharge end, said receptacle including means defining a source of radiant heat within said receptacle, helical conveying means operatively associated with said receptacle for advancing foodstuff from said feed end to said discharge end, said helical conveying means having a lesser pitch adjacent said feed end than said discharge end, means within said receptacle for cascading the foodstuff while the foodstuff is moving through said receptacle, whereby foodstuff advances through said receptacle adjacent said source of radiant heat more slowly at said feed end and more quickly at said discharge end.

5. An apparatus as in claim 4 and wherein said source of radiant heat comprises an electric resistance heater, and said receptacle comprises an elongate cage structure open at both ends and rotatable about its longitudinal axis.

6. An apparatus as in claim 5 and wherein said helical conveying means comprises a helical member attached to the interior of said receptacle.

7. An apparatus as in claim 6 and wherein said means for cascading the foodstuff comprises means for blowing air through said receptacle and means for heating the air being blown through said receptacle.

* * * * *